United States Patent [19]

Legon

[11] Patent Number: 4,838,508

[45] Date of Patent: Jun. 13, 1989

[54] ACCESSORY SUPPORT BRACKET

[76] Inventor: Jack Legon, R.D. 6, Box 92, Newton, N.J. 07860

[21] Appl. No.: 259,262

[22] Filed: Oct. 18, 1988

[51] Int. Cl.⁴ .............................................. A47B 91/00
[52] U.S. Cl. ............................... 248/346; 224/42.42; 248/311.2
[58] Field of Search .................. 248/674, 346, 311.2, 248/313; 108/44; 169/51; 224/913, 326, 327, 42.11, 42.42 R, 42.45 R

[56] References Cited

U.S. PATENT DOCUMENTS

| | | | |
|---|---|---|---|
| 2,899,162 | 8/1959 | Young | 224/42.42 R |
| 3,658,219 | 4/1972 | Ordt | 224/42.42 R |
| 3,685,708 | 8/1972 | Herrington | 224/42.42 R |
| 3,727,813 | 4/1973 | Eby | 224/42.42 R |
| 3,964,612 | 6/1976 | Skilliter | 224/42.42 R X |
| 3,984,161 | 10/1976 | Johnson | 224/42.42 R X |
| 4,097,012 | 6/1978 | McIntyre | 224/42.42 R X |
| 4,609,785 | 9/1986 | Drinkard | 248/558 X |
| 4,625,900 | 12/1986 | Lawson | 224/42.45 R X |

FOREIGN PATENT DOCUMENTS 2325248 12/1974 Fed. Rep. of Germany ... 224/42.45 R

Primary Examiner—J. Franklin Foss
Attorney, Agent, or Firm—David Teschner

[57] ABSTRACT

The invention deals with a support bracket for mounting accessory items in a vehicle employing available mounting facilities. A support bracket is fashioned with a first surface containing mounting apertures to receive the mounting hardware of an accessory item such as a fire-extinguisher, CB radio or the like. Coupled to the underside of such first surface are a pair of mounting legs dimensioned to sit astride the usual transmission tunel of a motor vehicle. Placed in the ends of such legs are apertures to receive the mounting bolts for the seat belts of the vehicle whereby the support bracket can be mounted without the need for drilling any further holes or adding any additional hardware beyond that already available in the vehicle.

7 Claims, 3 Drawing Sheets

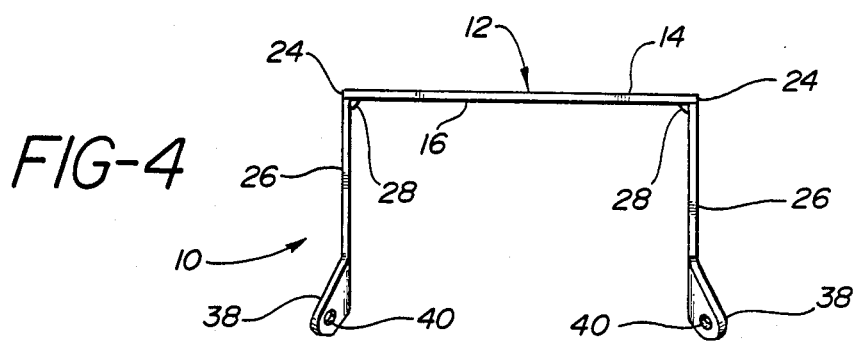
FIG-4
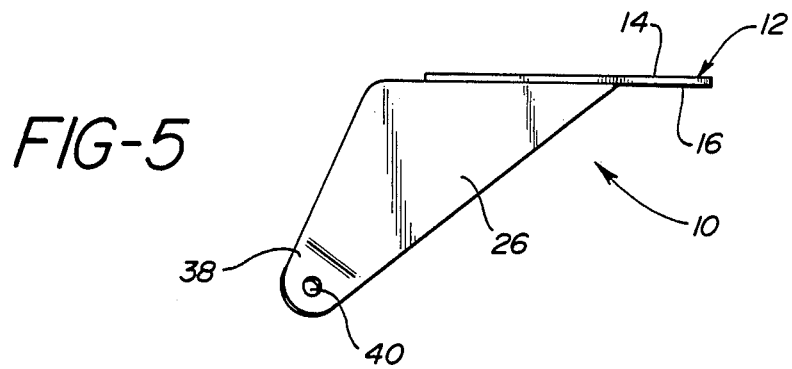
FIG-5
FIG-6
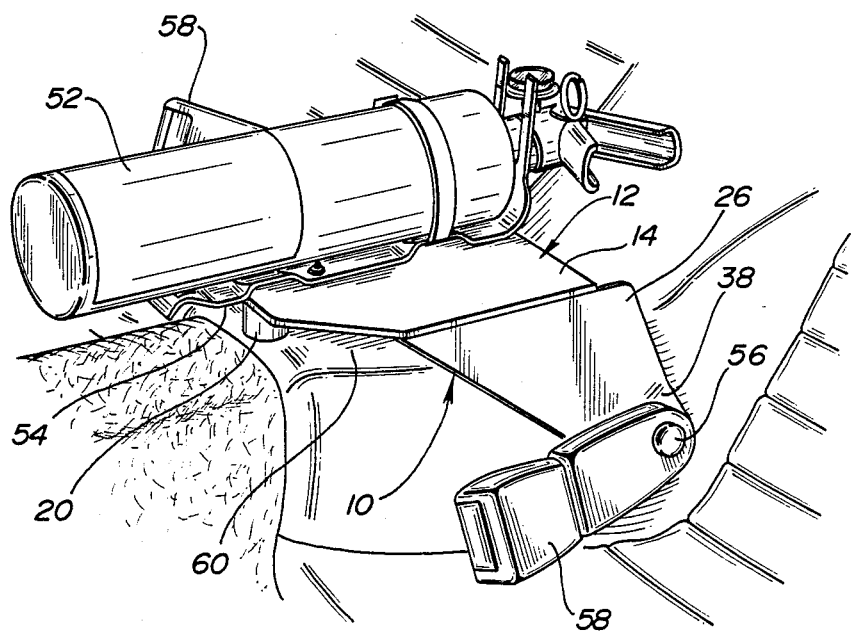

ACCESSORY SUPPORT BRACKET

BACKGROUND OF THE INVENTION

1. Field of the Invention

The invention is directed to the field of vehicle accessory item mounting and more particularly to the mounting of accessory items in a vehicle employing available mounting facilities.

2. Description of the Prior Art

At present, vehicles accessories fit into two broad categories based upon the way they are mounted in such vehicles. The first is the self-stick type generally employing a pressure sensitive adhesive pad or layer to affix an accessory such as a compass to the dash of a car. The weight of the accessory to be mounted is limited and the mounting surface has to be compatible with the adhesive. On some present-day vehicles, few metal or plastic flat surfaces are present and the padded dashboards usually have a wax-type finish which makes adherence of a pressure-sensitive adhesive difficult.

The other alternative mounting type is one which requires drilling and bolt-down of the component such as with a fire-extinguisher on the fire wall or a CB radio under the dash-board. Unless the exact lay-out of all ducts, wires, strips, etc., of the vehicle are known, drilling into a motor vehicle blind is dangerous. The drilling operation could sever important fluid lines or the attachment of screws and bolts could short out vehicle signal lines.

SUMMARY OF THE INVENTION

The present invention provides apparatus and means to mount accessory items of substantial weight in a vehicle employing available mounting facilities which would not disrupt the normal functions of the various vehicle systems. A support bracket is fashioned with a first surface of a base portion containing mounting apertures to receive the mounting hardware of accessory items. Such mounting hardware can include the quick-release strap mount of a fire extinguisher or the slide-out mount of a CB radio. Coupled to two, parallel, marginal edges of the base portion are side plates which form with the base portion a generally U-shape configuration to receive therebetween an automobile transmission tunnel when inverted upon same. A mounting arrangement is placed adjacent the free ends of such side plates to receive therethrough mounting bolts of accessory items already present. These mounting arrangements could be apertures or a series of graduated slots to receive the mounting bolts of seat belts already attached to the transmission tunnel. The graduated slots allow for different tunnel heights while scores on the base portion can control the base portion width to accommodate tunnels of different widths. It is an object of the invention to provide a novel support bracket mountable in a vehicle employing available mounting facilities.

It is another object of the invention to provide a novel support bracket for mounting accessory items in a vehicle employing available mounting facilities.

It is still another object of the invention to provide a novel support bracket whose dimensions can be varied based upon the vehicle component to which the support bracket is mounted.

It is yet another object of the invention to provide a novel support bracket for mounting a fire extinguisher in a quick release mount to a vehicle over its transmission tunnel employing the mounting hardware present for mounting seat belts to said same tunnel.

Other objects and features of the invention will be pointed out in the following description and claims and illustrated in the accompanying drawings which disclose, by way of example, the principles of the invention, and the best modes which have been contemplated for carrying them out.

BRIEF DESCRIPTION OF THE DRAWINGS

In the drawings in which similar elements are given similar reference characters:

FIG. 4 is a rear elevational view of the bracket of FIG. 1.

FIG. 5 is a side elevational view of the bracket of FIG. 1.

FIG. 6 is a front perspective view of the bracket of FIG. 1 installed to a vehicle and having a fire extinguisher mounted thereon.

DESCRIPTION OF THE PREFERRED EMBODIMENTS

Figure 1:
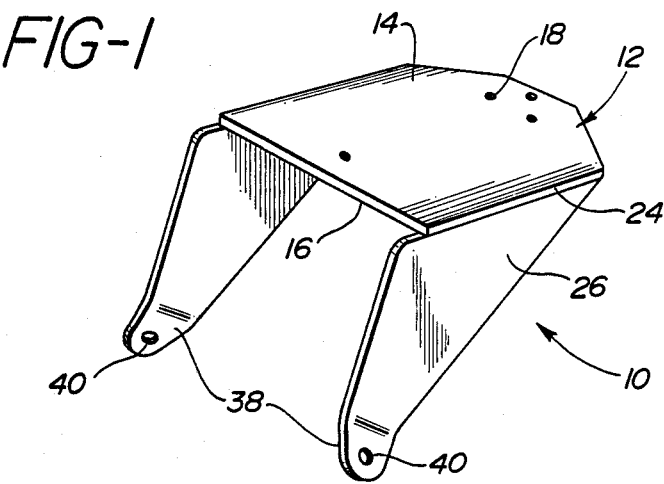
FIG. 1 is a rear perspective view of an accessory support bracket constructed in accordance with the concepts of the invention.
Figure 2:
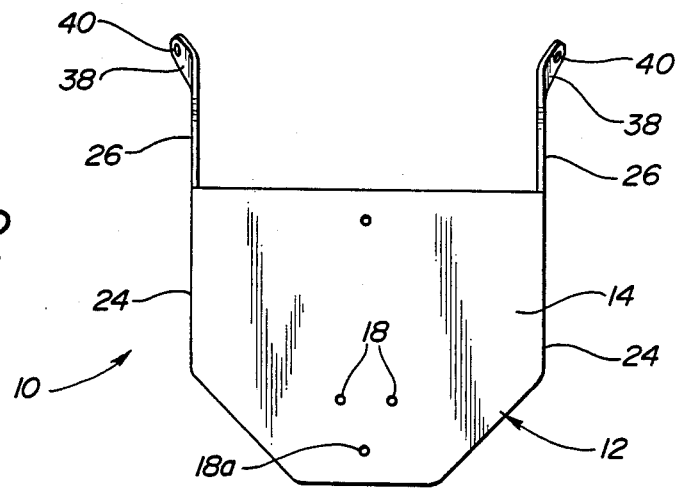
FIG. 2 is a top plan view of the bracket of FIG. 1.

Turning now to FIGS. 1 to 5, there is shown an accessory support bracket 10 constructed in accordance with the concepts of the invention. A base plate 12 has a top face 14 shown as flat but which may be contoured as desired to better mate with specific accessories if desired. Base plate 12 has a plurality of apertures 18 which extend from top face 14 to a parallel bottom face 16 best seen in FIG. 3. The placement of the apertures 18 may be specific as where a particular accessory is to be mounted or may be in a pattern to accept a wide variety of accessories. A spacer 20 is shown mounted on bottom face 16 using fastener 22 through aperture 18a (FIG. 2). The height, size and shape of spacer 20 will depend upon the space between bottom face 16 and the top of any adjacent vehicle surface to insure a solid, shake-proof mounting of the bracket 10.

Attached along marginal edges 24 of base plate 12 are a pair of side walls 26 which extend generally in parallel to one another and perpendicular to the plane of base plate 12 forming a generally inverted U-shaped structure which can easily be placed over the transmission tunnel of a motor vehicle either in front of the front seat or behind it. Although FIGS. 1 to 5 show a bracket 10 fabricated with a single width set between the side walls 26, a variable width construction is possible as shown in FIG. 7.

Figure 7:
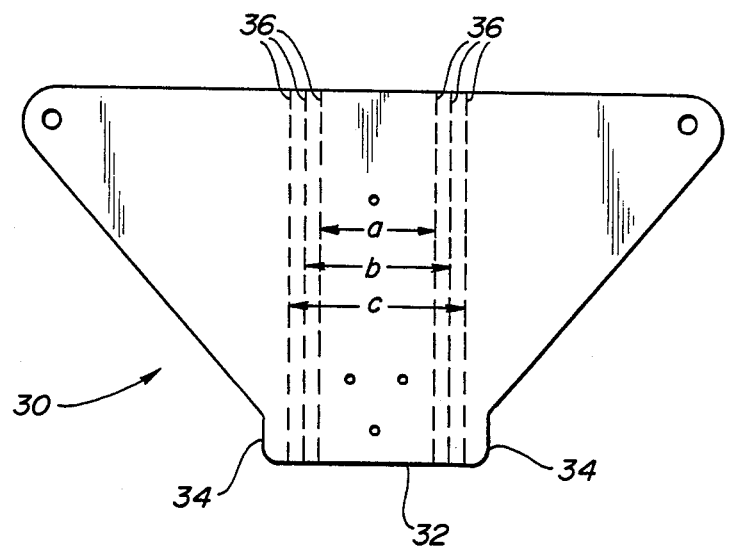
FIG. 7 is a top plan view of an alternative embodiment of a bracket constructed in accordance with the concepts of the invention.

In FIG. 7, bracket 30 is fabricated with base plate 32 and side walls 34 as an integral unit. A plurality of score lines 36 are placed adjacent the marginal edges to permit the side walls 34 to be folded down along these score lines 36 to provide a base plate having a width of "a", "b" or "c" as desired.

Figure 3:
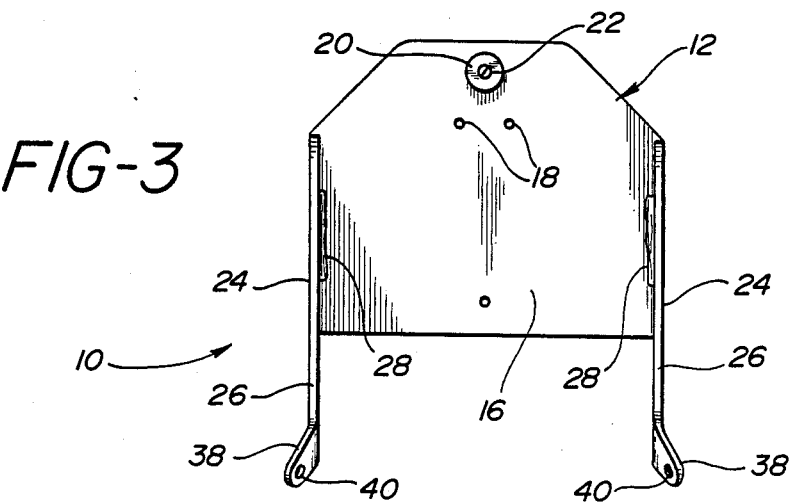
FIG. 3 is a bottom plan view of the bracket of FIG. 1 and further including an optional spacer.

Returning now to FIGS. 1 to 5, the bracket 10 can also be fabricated from a single piece of metal, for example sheet aluminum of suitable hardness and strength and thickness or could be fabricated of a separate base plate 12 to which are welded, brazed, cold-welded, etc., side walls 26. If desired, strengthening fillets 28 can be added between bottom face 16 and the inside surface of side walls 26 as is seen in FIG. 3.

Figure 8:
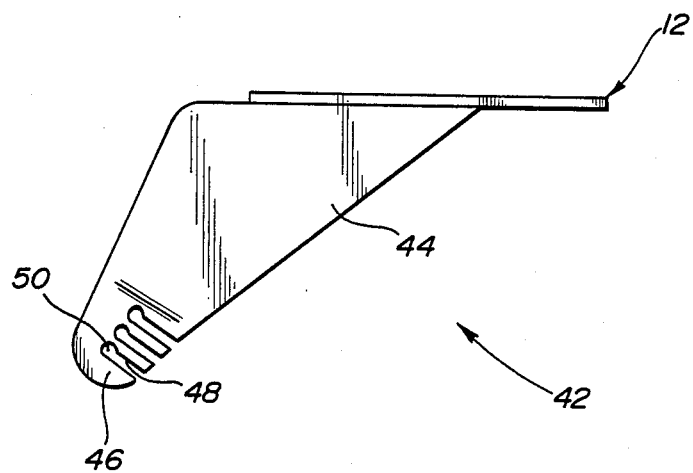
FIG. 8 is a side elevation of yet another embodiment of the invention.

The free ends 38 of the side walls 26 are tapered outwardly away from the plane of the remainder of the side walls 26 to make passage over the side walls of the transmission tunnel and over the mounting bolts of the seat belts (not shown) easier. Apertures 40 are placed in the side walls 26 adjacent the free ends 38. In order to better control the position of the base plate 12 with respect to the tunnel, a series of graduated slots 48 are placed in the side wall 44 of the alternate form of bracket 42 shown in FIG. 8. Starting adjacent the free end 48 of side wall 44, each slot 48 terminates in an aperture 50. One selects the slot 48 that positions base plate 12 closest to the tunnel top; then the bracket 42 can be moved along the slot 48 until the mounting bolt of the seat belt (not shown) is seated in the aperture 50 and thus prevents unwanted removal.

Turning now to FIG. 6, there is shown how bracket 10 can be used to mount a fire extinguisher 52 to the seat belt mounting bolts 56 over vehicle transmission tunnel 60. The usual fire extinguisher 52 quick-release mounting bracket 54 is fastened to the top face 14 using suitable fasteners (not shown) passed through apertures 18. The extinguisher 52 can then be locked down to the bracket 10 or added later. The seat belt mounting bolts 56 and the seat belt receivers 58 are removed and the free ends 38 of the side walls 26 are moved over the side walls of tunnel 60 until apertures 40 are adjacent the apertures (not shown) to receive the seat belt bolts 56. The receivers 58 are moved into place and the bolts 56 are placed through the receivers 58, apertures 40 into the tunnel wall apertures and tightened as needed.

Accordingly, there has been shown how to provide an accessory mounting bracket which can be used to mount a wide variety of accessory items in a vehicle using existing mounting accessories without the need for additional tools and without danger to the vehicle or occupant.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

I claim:

1. An accessory bracket for mounting accessory items in a vehicle employing available mounting facilities comprising:
    a base portion having a first face and a second face and a first pair of parallel marginal edges;
    a pair of side plates, one coupled to each of said marginal edges of said base portion;
    said side plates extending generally perpendicular to said base portion second face and forming a generally inverted U-shape therewith;
    and aperture means in each of said side plates adjacent the free ends thereof for receipt therethrough of the mounting bolts of items already mounted upon such vehicles;
    wherein each of said side plates has a leading edge and a trailing edge and said aperture means is a series of slots in said side plates adjacent the free ends thereof each extending from said leading edge toward said trailing edge whereby the second face of said base portion may be placed at different distances above such mounting bolts.

2. An accessory bracket as defined in claim 1, wherein the free ends of each of said side plates is bent outwardly away from the plane of the remainder of said side plates.

3. An accessory bracket as defined in claim 1, wherein said base portion and said side plates are unitary.

4. An accessory bracket as defined in claim 3, wherein said base portion is scored in lines parallel to its marginal edges to permit said base portion to be varied in width to accommodate structures of different widths between said side plates.

5. An accessory bracket as defined in claim 1, wherein said base portion has a plurality of apertures therein to receive the mounting hardware of various accessory items.

6. An accessory bracket as defined in claim 5, wherein the mounting bracket of an auto fire extinguisher is coupled to said first face of said base portion and said bracket is mounted to an automobile by passing seat belt anchoring bolts through said aperture means in said side plates.

7. An accessory bracket as defined in claim 1 further comprising spacer means coupled to said second face of said base portion to compensate for any space between said second face of said base portion and the vehicle portion adjacent said base portion second face.

* * * * *